US006955513B2

(12) United States Patent
Niku

(10) Patent No.: US 6,955,513 B2
(45) Date of Patent: Oct. 18, 2005

(54) FLEXIBLE FASTENER

(75) Inventor: Saeed Benjamin Niku, San Luis Obispo, CA (US)

(73) Assignee: California Polytechnic State University Foundation, San Luis Obispo, CA (US)

( * ) Notice: Subject to any disclaimer, the term of this patent is extended or adjusted under 35 U.S.C. 154(b) by 0 days.

(21) Appl. No.: 10/065,564

(22) Filed: Oct. 30, 2002

(65) Prior Publication Data

US 2003/0180117 A1 Sep. 25, 2003

Related U.S. Application Data

(60) Provisional application No. 60/366,165, filed on Mar. 21, 2002.

(51) Int. Cl.[7] ..................................................... F16B 35/02

(52) U.S. Cl. ....................... 411/382; 411/392; 411/424; 411/438

(58) Field of Search ................................. 411/378, 392, 411/424, 438, 411, 901, 902, 383, 384

(56) References Cited

U.S. PATENT DOCUMENTS 36,014 A 7/1862 Meissner
240,780 A * 4/1881 Smith .......................... 74/458
370,136 A * 9/1887 Goddu ....................... 411/411

(Continued)

FOREIGN PATENT DOCUMENTS

| | | |
|---|---|---|
| FR | 958192 | 3/1950 |
| GB | 572218 | 9/1945 |

OTHER PUBLICATIONS

PCT/US03/08140. International Search Report. May 5, 2003.
"Professor, university pursue provisional patent for flexible bolt", by Colin Hester, Mustang Daily–a publication of CalPoly San Luis Obispo. vol. LXVI, No. 123, (May 3, 2002).
Brochure, "Producing Superior Results From Concept to Completion", The Deshler Group Inc., Deshler, Ohio; Amanda Bent Bolt Co.
Catalog; Simpson Strong–Tie Co. Inc., Copyright 1998, pp. 14–17.
Catalog. "Stow Flexible Shafts annd Flexible Couplings", 9$^{th}$ edition, The Stow Manufacturing Co, Binghamton, New York.
Website; Amanda Bent Bolt; www.amandabentbolt.com, (Jan. 9, 2001).
Website; AristoTechnics, Inc.; www.artsotechnics.com, (Jan. 11, 2001).

*Primary Examiner*—Flemming Saether
(74) *Attorney, Agent, or Firm*—Thomas F. Lebens; Sinsheimer, Schiebelhut & Baggett

(57) ABSTRACT

This invention relates generally to a flexible fastener for coupling members. In a preferred embodiment, the flexible fastener may be used to couple members that are non-parallel, non-aligned, or in specific instances when selective compliance in a member is desired. The present invention is directed generally to a fastener that is laterally flexible along its length, comprising a shank covered with a spiral set of teeth and a flexible core material running internally to the shank and along the length of the shank, wherein the shank and the flexible core material are coupled at both distal ends of the fastener. In a preferred embodiment, a means for imparting rotational movement to the fastener is attached at a distal end. The preferred means are a bolt head and a screw head.

4 Claims, 7 Drawing Sheets

U.S. PATENT DOCUMENTS

| | | | | | |
|---|---|---|---|---|---|
| 1,462,126 | A | | 9/1923 | Thomas | |
| 1,756,973 | A | | 5/1930 | Conner | |
| 1,828,287 | A | | 10/1931 | MacBean | |
| 2,045,757 | A | * | 6/1936 | Constantin | 198/659 |
| 2,672,070 | A | * | 3/1954 | Forster | 411/438 |
| 3,350,811 | A | * | 11/1967 | Martin | 446/117 |
| 3,942,329 | A | | 3/1976 | Babcock | |
| 3,945,070 | A | * | 3/1976 | Hauser | 470/18 |
| 4,269,248 | A | | 5/1981 | MacLean et al. | |
| 4,395,924 | A | * | 8/1983 | Callahan | 74/424.74 |
| 4,402,160 | A | * | 9/1983 | Brusasco | 49/352 |
| 4,432,683 | A | | 2/1984 | Polos | |
| 4,437,286 | A | | 3/1984 | Maguire | |
| 4,589,179 | A | * | 5/1986 | Hulting, Jr. | 29/256 |
| 4,756,654 | A | | 7/1988 | Clough | |
| 4,974,986 | A | | 12/1990 | Cook | |
| 5,061,137 | A | | 10/1991 | Gourd | |
| 5,501,541 | A | | 3/1996 | Gomes | |
| 5,797,234 | A | | 8/1998 | Theodorou | |
| 6,647,556 | B2 | * | 11/2003 | Grepper et al. | 2/425 |

* cited by examiner

FLEXIBLE FASTENER

CROSS REFERENCE TO RELATED APPLICATIONS

This application claims priority under 35 U.S.C. §119(e) to U.S. Provisional Patent Application Ser. No. 60/366,165 of Niku, filed Mar. 21, 2002, incorporated herein by reference as if set forth in its entirety.

BACKGROUND OF THE INVENTION

1. Field of the Invention

This invention relates generally to a flexible fastener for coupling members. In a preferred embodiment, the flexible fastener may be used to couple members that are non-parallel, non-aligned, or in specific instances when selective compliance in a member is desired.

2. Discussion of the Related Art

Entirely rigid fasteners have been used previously to couple members. However, due to the rigidity of prior art fasteners, only perfectly planar and aligned members could be coupled. Additionally, members requiring selective compliance, could not be attached with the fasteners of the prior art.

Previously contemplated devices to obviate these and other problems were developed such as the bolt structure described in U.S. Pat. No. 36,014 of Meissner. Meissner teaches a bolt structure made of a shank comprised of a collection of wires twisted together with solid ends on either end of the shank. The solid ends at either end of the shank are for a bolt head and for cutting threads necessary to receive a nut. The bolt contemplated by Meissner consists of a flexible portion intermediate to solid portions on either distal end of the bolt structure. While the bolt described by Meissner may be advantageous in comparison to a totally rigid bolt in some circumstances, the bolt still has some limitations. Namely, the inherently rigid portions on either end of Meissner's bolt are not sufficient to couple non-planar or non-aligned members easily. Additionally, because the threads of Meissner's bolt are limited solely to the rigid portions on either side of the flexible material, the bolt cannot accept a nut along its entire length. Finally, due the rigid portions at either end of Meissner's bolt, it cannot be laterally flexible along its entire length.

The present invention addresses the above and other needs.

SUMMARY OF THE INVENTION

The present invention is directed generally to a fastener that is laterally flexible along its length, comprising a shank covered with a spiral set of teeth and a flexible core material running internally to the shank and along the length of the shank, wherein the shank and the flexible core material are coupled at both distal ends of the fastener.

In a preferred embodiment, a means for imparting rotational movement to the fastener is attached at a distal end. The preferred means are a bolt head and a screw head.

BRIEF DESCRIPTION OF DRAWINGS

The above mentioned and other objects and features of this invention and the manner of attaining them will become apparent, and the invention itself will be best understood by reference to the following description of the embodiment of the invention in conjunction with the accompanying drawings, wherein.

DETAILED DESCRIPTION

Figure 1:
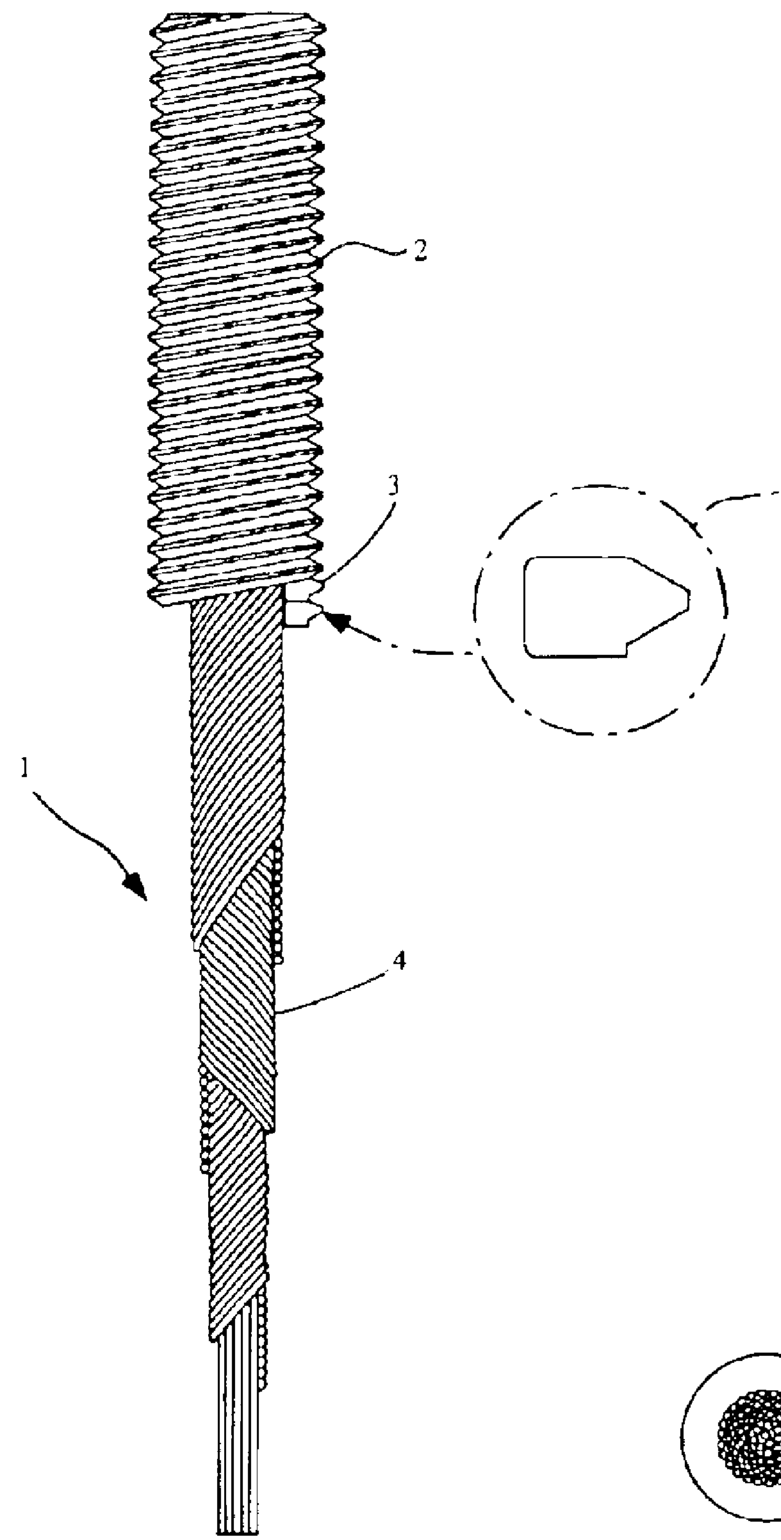
FIG. 1 is a side elevational view, partly in cross section, of a flexible fastener with flexible core material composed of innermost wires grouped and bound with wires spirally wound in opposing directions, and a detail picture of a tooth.

The following description is of the best mode presently contemplated for practicing the invention. This description is not to be taken in a limiting sense, but is made merely for the purpose of describing the general principles of the invention. The scope of the invention should be ascertained with reference to the issued claims. In the description that follows, like numerals or reference characters will be used to refer to like parts or elements throughout.

The fastener of the present embodiment is compliant in lateral directions, yet capable of carrying axial loads, i.e. the fastener is not compliant in the axial direction. As such, the fastener may be used in a variety of applications to connect, tighten, or load other elements in the axial direction along the length of the fastener as any other fastener is, but is flexible to go through mismatched and misaligned holes-and holes that are not straight, between non-parallel (i.e. non-planar) surfaces, or in machine applications where small lateral movements are desired.

The fastener constructed in accordance with the present embodiment is designed for many uses for which it would be impracticable or impossible to employ a rigid or inflexible fastener. Thus, in many cases, in securing members together, it is not possible to position the members in a perfectly parallel (i.e. non-planar) or aligned fashion. Therefore, a bolt with inherent flexibility may be used to secure members that are either non-parallel or non-aligned, due to production or construction errors. Such errors may include incorrectly bored holes, incorrectly aligned members or mismatched members. Although the embodiment contemplates coupling non-parallel or non-aligned members, due to the fastener's ability to carry an axial load, the fastener may be used to couple members that are planar or aligned. The fastener is multi-faceted and may be used in numerous applications and situations to couple various types of members. Among the types of members that may be connected are plastic, wood, metal, drywall, rubber, leather, cardboard, rock and/or granite (such as in the use of countertops) and either hollow or solid. Besides providing a means to fasten members that are non-parallel or non-aligned, the embodiment may also be used in circumstances when selective compliance is useful or necessary. Selective compliance, i.e. maintaining stiffness in the axial direction, but compliance in the lateral direction, is especially useful in machinery. In a preferred embodiment, the fastener may be used specifically in robots. For example, in one embodiment, it may be advantageous for the robot to move a part laterally, but not axially, such as in inserting one part into another during assembly. Therefore, a flexible fastener may be used to couple the part to the robot so that the part will have lateral motion, but not axial motion. The fastener may be used in combination with various robotic parts either alone or with other types of fasteners, or for example, in conjunction with other flexible fasteners.

Referring now to the drawings, the features and embodiments are now further described. In FIG. 1, a flexible fastener 1 is depicted. Shown are a flexible fastener 1, a shank 2, a spiral set of teeth (i.e. threads) 3, a flexible core material 4, a detail picture of a tooth 5, which in combination with other teeth comprises the spiral set of teeth (i.e. threads) 3. The shank 2, which is covered with a spiral set of teeth (i.e. threads) 3, surrounds the flexible core material 4. The flexible core material 4 is connected to the shank 2 at both distal ends.

In a preferred embodiment, the shank 2 may be made of various types of materials such as metal, solid plastic material, composites, fiberglass, and fibers of various materials such as carbon, Kevlar, silk, linen, and nylon. The shank 2 is covered with a spiral set of teeth 3 (i.e. threads), which can slide, rotate or both slide/rotate relative to each other. The spiral set of teeth (i.e. threads) 3 can be made of materials similar to the materials that the shank is made of, i.e. the spiral set of teeth (i.e. threads) 3 can also be made of metal, solid plastic material, composites, fiberglass, and fibers of various materials such as carbon, Kevlar, silk, linen, and nylon. Also shown in FIG. 1 is a detail picture of one possible conformation of a tooth 5, which in combination with similar teeth comprises the spiral set of teeth (i.e. threads) 3. Although the structure of tooth 5 shows one possible conformation, many other conformations of teeth are possible to produce a spiral set of teeth (i.e. threads) 3, as are described and depicted later in the application.

The flexible core material 4 is flexible and load carrying. The flexible core material 4 can be made of almost any material in any appropriate configuration such that it provides axial load carrying capability while laterally flexible. In a preferred embodiment, the flexible core material 4 can be made of nylon or other fibers, torque carrying flexible shafts, and solid plastic material. In another preferred embodiment, the flexible core material 4 may be comprised of innermost wires grouped and bound with wires spirally wound in opposing directions, as is shown in FIG. 1. Although in some situations this particular conformation may be advantageous, the flexible core material may assume many other conformations including individual fibers running in the same direction along the length of the flexible fastener 1, such as is shown in FIG. 3, or solid material running the length of the flexible fastener 1.

The flexible core material 4 is coupled to the shank 2, which is covered by a set of spiral teeth (i.e. threads) 3 at both distal ends. Any method may be employed to couple the flexible core material 4 to the shank 2. As a result of coupling the flexible core material 4 to the shank 2, the fastener remains flexible while a nut can travel along the length of the bolt and carry an axial load. In a preferred embodiment, the flexible core material 4 is connected to the shank 2 by any method such as gluing, brazing, welding, and pinching. In another preferred embodiment, the flexible core material 4 may be coupled to the shank 2 by welding, pinching or brazing a plate, such as a washer, to the flexible core material 4 at a distal end so that the shank 2, comprised of threads 3, sits on top of the plate.

Figure 2:
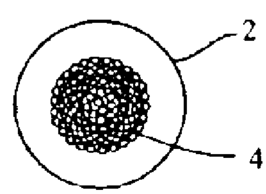
FIG. 2 is an end view of the flexible fastener of FIG. 1 with flexible core material composed of innermost wires grouped and bound with wires spirally wound in opposing directions.

Looking now at FIG. 2, an end view of the flexible fastener 1 is shown. Included in the end view are the shank 2 and the flexible core material 4, which runs the length of the flexible fastener 1. The end view shows only one possible configuration of the flexible core material 4. In this case, the flexible core material 4 is comprised of innermost strands grouped and bound with strands spirally wound in opposing directions.

Figure 3:
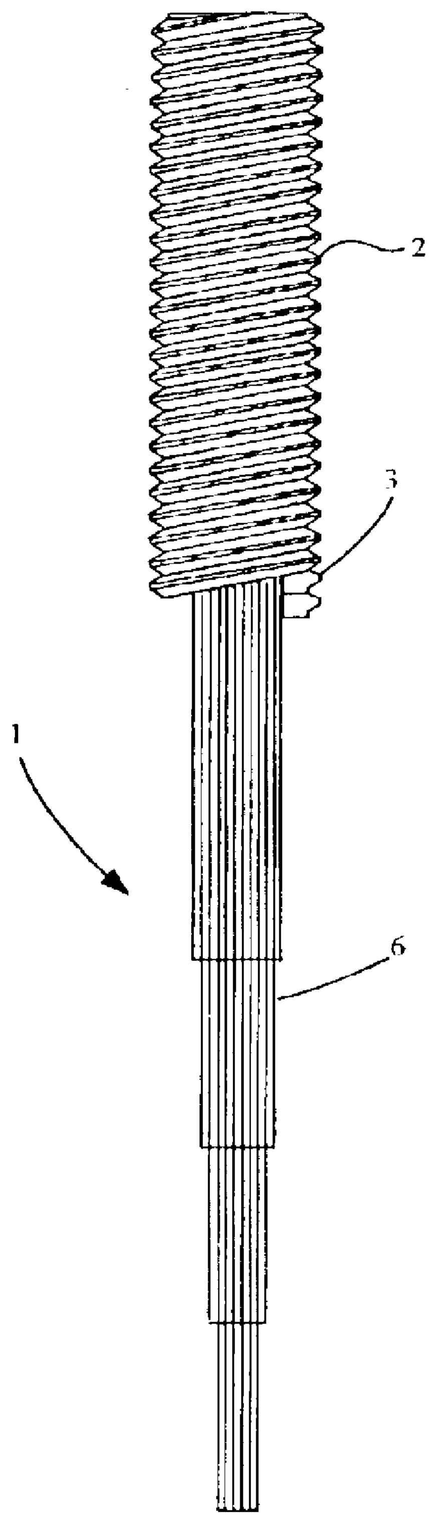
FIG. 3 is a side elevational view, partly in cross section, of a flexible fastener with flexible core material composed of individual innermost wires.

Shown in FIG. 3 is another example of a flexible fastener 1. Shown are a flexible fastener 1, a shank 2, a spiral set of teeth (i.e. threads) 3, and a second type of flexible core material 6. The shank 2, which is covered with a spiral set of teeth (i.e. threads) 3, surrounds the type 11 flexible core material 6. The flexible core material 6 is connected to the shank 2 at both distal ends. The type 11 flexible core material 6 is composed of a number of individual threads running in a single orientation the entire distance of the flexible fastener 1. The type 11 flexible core material 6 is just another example of the numerous configurations the core material may have.

Figure 4:
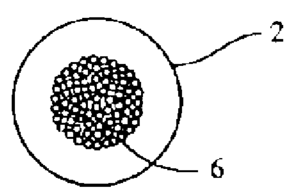
FIG. 4 is an end view of the flexible fastener of FIG. 3 with flexible core material composed of individual innermost wires.

FIG. 4 shows an end view of the flexible fastener 1. Included in the end view are the shank 2 and the type II flexible core material 6, which runs the length of the flexible fastener in a single orientation and is composed of a number of individual strands grouped together. The type II flexible core material 6 is another example of the many possible configurations that the core material may have.

Figure 5:
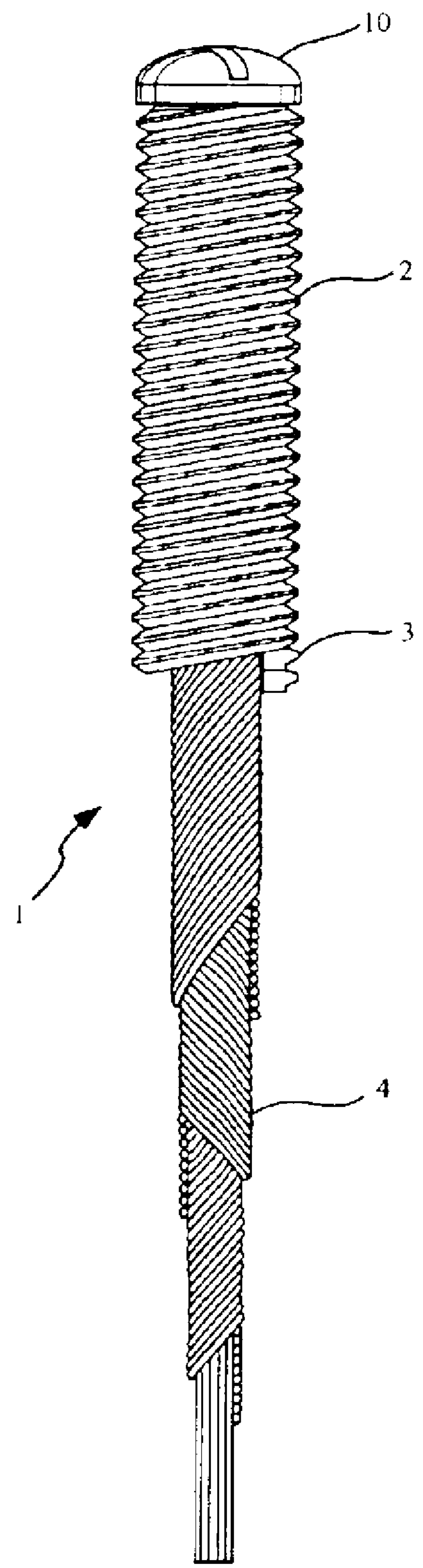
FIG. 5 is a side elevational view, partly in cross section, of a flexible fastener with a screw head.

Shown in FIG. 5 is a flexible fastener 1 with a screw head 10. Shown are a flexible fastener 1, a shank 2, a spiral set of teeth (i.e. threads) 3, a flexible core material 4, and a screw head 10. Coupled with a distal end of the shank 2 is a screw head 10. Flexible core material 4 runs internally along the length of the flexible fastener 1. Surrounding the flexible core material 4, is the shank 2, which is covered with a set of spiral teeth (i.e. threads) 3.

In a preferred embodiment, a means for imparting rotational movement may be coupled with a distal end of the flexible fastener 1. The means, although not necessary for using the flexible fastener 1, may be advantageous in certain applications. In a preferred embodiment, the means for imparting rotational movement is a screw head 10. In this scenario, the groove carved into the screw head 10 may be in a conformation to accept either a standard or Philips type screwdriver. In this case, the flexible fastener 1 may couple two members when a screwdriver is applied to the screw head 10 and is subsequently rotated, thereby rotating the entire flexible fastener 1, to secure the flexible fastener 1 into the members. The other distal end of the flexible fastener 1 may be fashioned to include a spiral set of teeth (i.e. threads)

3 so that each consecutive layer of teeth has a slightly smaller diameter than the previous one until the distal end ends in a point so that the flexible fastener 1 may be secured into a hard surface such as a wall or board. Alternatively, the other distal end may end bluntly.

Figure 6:
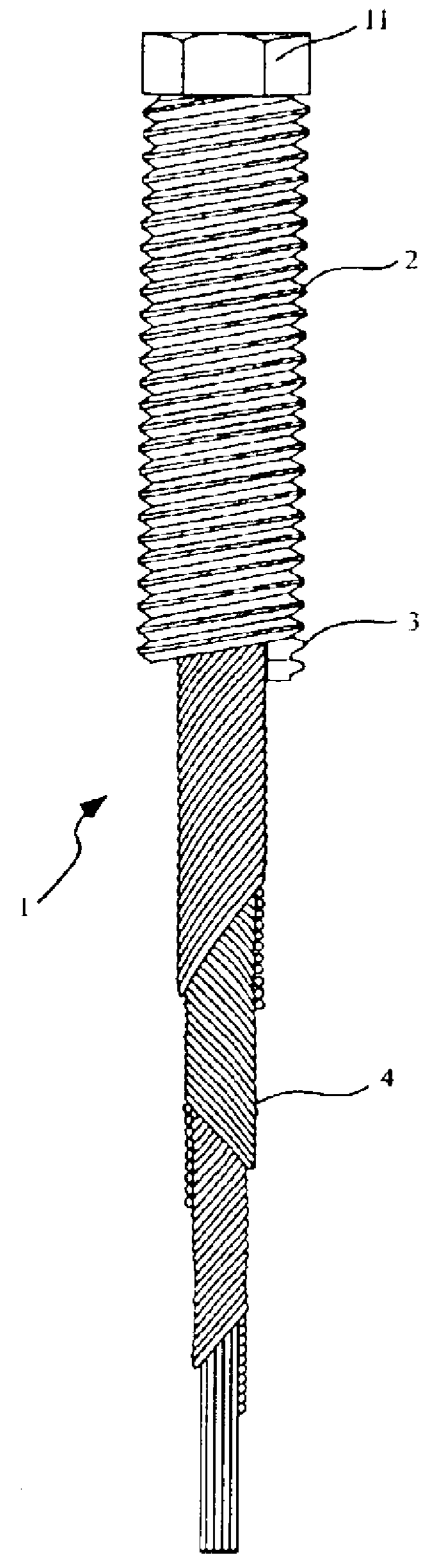
FIG. 6 is a side elevational view, partly in cross section, of a flexible fastener with a bolt head.

Shown in FIG. 6 is a flexible fastener 1 with a bolt head 11. Shown are a flexible fastener 1, a shank 2, a spiral set of teeth (i.e. threads) 3, a flexible core material 4, and a bolt head 11. Coupled with a distal end of the shank 2 is a bolt head 11. Flexible core material 4 runs internally along the length of the flexible fastener 1. Surrounding the flexible core material 4, is the shank 2, which is covered with a set of spiral teeth (i.e. threads) 3.

In another preferred embodiment, the means for imparting rotational movement is a bolt head 11. Although as in the case of the screw head, the rotational means are not necessary for using the flexible fastener 1. However, the means may be advantageous in certain applications. In a preferred embodiment, the bolt head 11 is coupled to a distal end of the flexible fastener 1. The bolt head 11 may be made of a mass of metal, or some other material, in a rectangular or hexagonal shape. Although a rectangular or hexagonal shape is preferred, any standard shape to fit a wrench, or other rotational device, may be employed. To impart rotational movement, a wrench, or other device for applying torque to a bolt head, may be applied to the bolt head 11 so that the bolt head 11 rotates, and thereby rotates the entire flexible fastener 1 so that the flexible fastener 1 may couple two members. Alternatively, the wrench, or other device for applying torque may be applied to a nut so that the nut is rotated with respect to the flexible fastener 1. The other distal end of the flexible fastener 1 may be fashioned to include a spiral set of teeth (i.e. threads) 3 so that each consecutive layer of teeth has a slightly smaller diameter than the previous one until the distal end ends in a point so that the flexible fastener 1 may be secured into a hard surface such as a wall or board. Alternatively, the other distal end may end bluntly.

Figure 7:
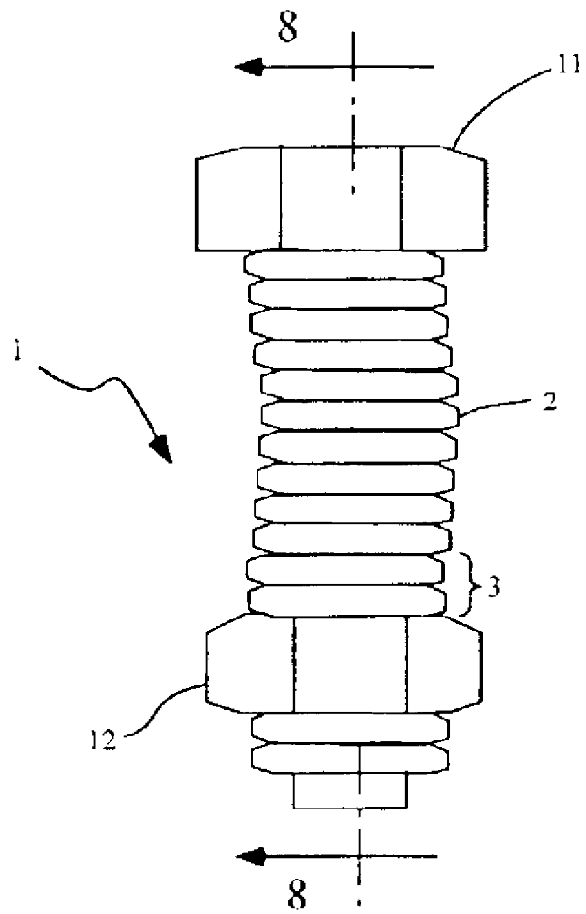
FIG. 7 is a side elevational view of a flexible fastener with a bolt head and nut.
Figure 8:
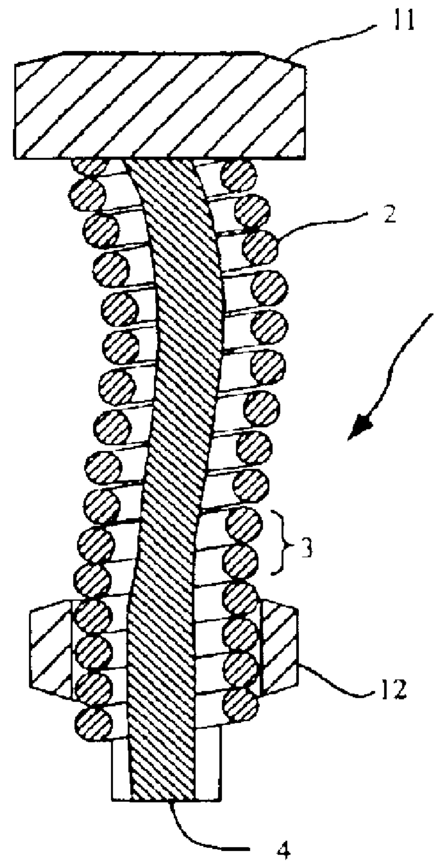
FIG. 8 is a side elevational view, in cross section, of a flexible fastener with a bolt head and nut.

Turning now to FIGS. 7 and 8, a flexible fastener 1 with a bolt head 11 and nut 12 is shown. Shown are a flexible fastener 1, a shank 2, a spiral set of teeth (i.e. threads) 3, flexible core material 4, a bolt head 11, and a nut 12. The flexible core material 4 is surrounded by the shank 2, which is covered with a spiral set of teeth (i.e. threads) 3. The shank 2 is shown with a bolt head 11 coupled at one distal end and a nut receiving means coupled at the other distal end. A nut 12 is shown engaged with the flexible fastener 1.

As a nut 12 is engaged with a flexible fastener 1, the flexible fastener 1 is constructed so that the spiral set of teeth (i.e. threads) 3 are compressed so that the tensile load is carried by the flexible core material 4 (as opposed to the spiral set of teeth (i.e. threads) 3). Therefore, tension is not carried by the threads, but is transferred to the flexible core material 4, thus increasing the strength of the flexible fastener 1.

Figure 9:
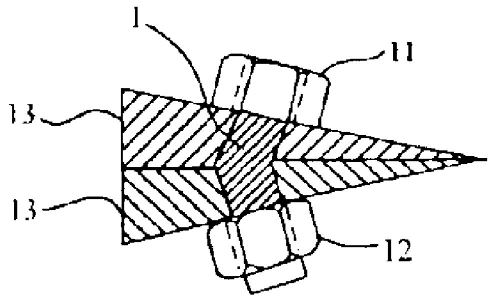
FIG. 9 is an example of a flexible fastener coupling two members that are non-parallel.

Referring now to FIG. 9, two non-parallel members 13 are shown coupled with a flexible fastener 1. Shown are a flexible fastener 1, a bolt head 11, two non-parallel members 13, and a nut 12. The flexible fastener 1 is inserted through holes in both non-parallel members 13 and secured with a nut 12 by rotating the bolt head 11 relative to the nut 12. Alternatively, the nut 12 may be rotated relative to the bolt head 11. The flexible fastener 1 is shown to have lateral flexibility while carrying an axial load.

Figure 10:
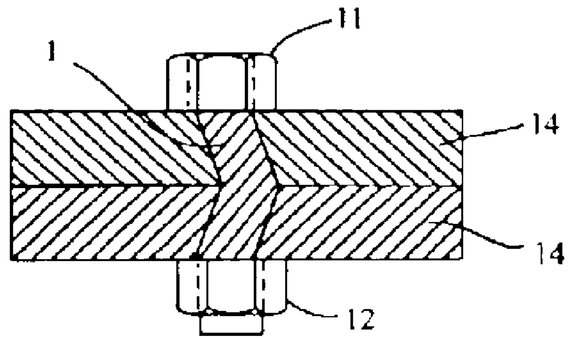
FIG. 10 is an example of a flexible fastener coupling two members that are non-aligned.

Turning now to FIG. 10, two members with non-aligned holes 14 are shown coupled with a flexible fastener 1. Shown are a flexible fastener 1, a bolt head 11, two non-aligned members 14, and a nut 12. The flexible fastener 1 is inserted through holes in both non-aligned members 14 and secured with a nut 12 by rotating the bolt head 11 relative to the nut 12. Alternatively, the nut 12 may be rotated relative to the bolt head 11. The flexible fastener 1 is shown to have lateral flexibility while carrying an axial load.

Figure 11:
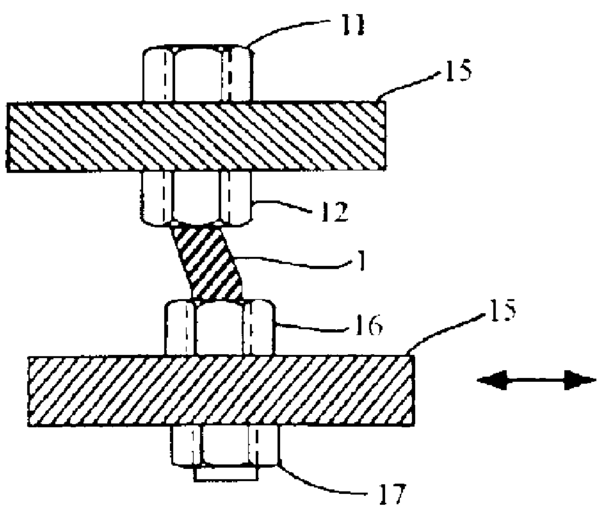
FIG. 11 is an example of a flexible fastener coupling two members that have selective compliance relative to each other.

Looking now at FIG. 11, a flexible fastener 1 is shown coupling two members 15 in a selectively compliant manner, in this case laterally. Shown are a flexible fastener 1, a bolt head 11, members 15 connected in a laterally compliant manner and nuts 12, 16, and 17. The flexible fastener is inserted through holes in both members 15 and secured with a series of nuts 12, 16, 17 by rotating the bolt head 11 relative to, the first nut 12 and then rotating the second nut 16 relative to the first nut 12 and so on. Alternatively, the first nut 12 may be rotated relative to bolt head 11 and then the second nut 16 rotated relative to the first nut 12 and so on. The flexible fastener 1 is shown to have compliance in the lateral direction while maintaining rigidity in the axial direction. In this embodiment, the selectively compliant members 15 may have motion relative to each other in the lateral direction only.

As is shown in FIG. 12, FIG. 13, FIG. 14, FIG. 15, FIG. 16, FIG. 17, and FIG. 18, many different variations of teeth are contemplated for use in the present invention. The spiral set of teeth 3 (i.e. threads) can be made of any material that is fit to carry the intended loads, in many different conformations, such as those shown in FIG. 12, FIG. 13, FIG. 14, FIG. 15, FIG. 16, FIG. 17, and FIG. 18, so long as it carries the intended loads and the threads remain laterally flexible. Additionally, the spiral set of teeth 3 (i.e. threads) should be able to slide, rotate, or both slide and rotate relative to each other.

Figure 12:
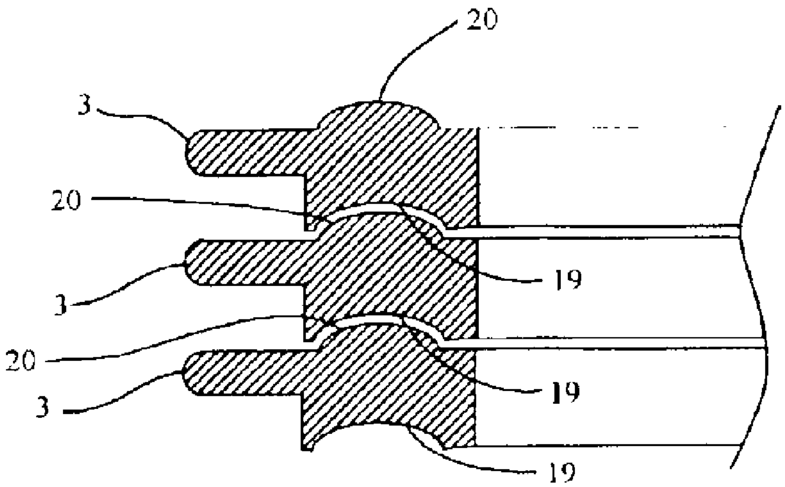
FIG. 12 is an example of fastener threads (or teeth)
Figure 13:
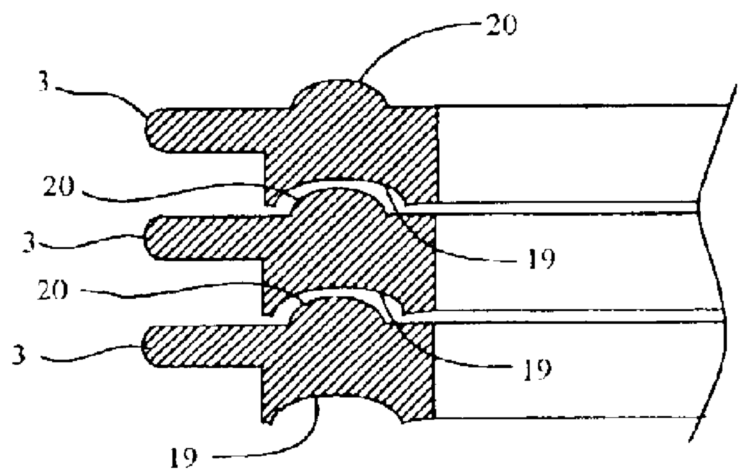
FIG. 13 is an example of fastener threads (or teeth) that allow rotation.
Figure 14:
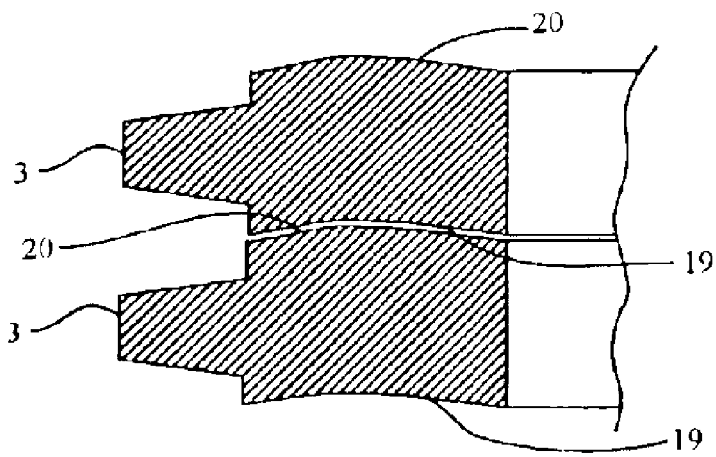
FIG. 14 is an example of fastener threads (or teeth) that were cut from a square threaded bolt.
Figure 15:
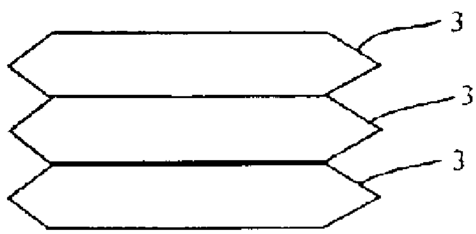
FIG. 15 is an example of fastener threads (or teeth)
Figure 16:
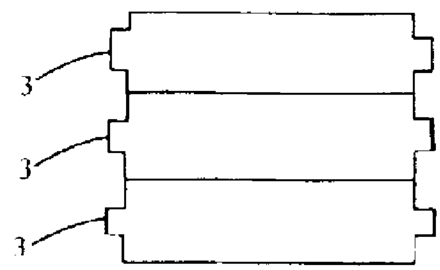
FIG. 16 is an example of fastener threads (or teeth)
Figure 17:
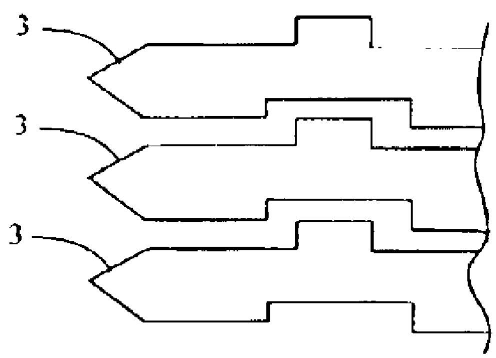
FIG. 17 is an example of fastener threads (or teeth)
Figure 18:
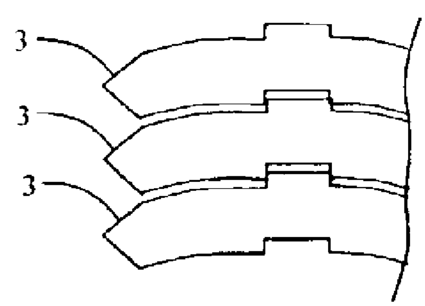
FIG. 18 is an example of fastener threads (or teeth).

Certain variations of teeth may be especially useful in different circumstances. For example, an interlocking spiral set of teeth 3 (i.e. thread pattern), such as those shown in FIG. 12, FIG. 13, FIG. 14, FIG. 17 and FIG. 18, are useful for larger loads because they prevent buckling of teeth. The outward protrusion on interlocking teeth may be various sizes relative to the inward protrusion on a receiving layer of interlocking teeth. For example, the outward protrusion may be substantially the same size as the inward protrusion, such as shown in FIG. 18 or the outward protrusion may be smaller than the inward protrusion, such as shown in FIG. 17. Additionally, the outward and inward protrusions may be in various orientations, i.e. the outward protrusion may be oriented toward the top or bottom of the fastener, or both to the top and bottom of a fastener, such as in the case when several sets of interlocking protrusions are used along the same tooth layer. Furthermore, the spiral set of teeth 3 may be curved in numerous fashions. In one embodiment, the spiral set of teeth 3 may be curved up towards the top of the fastener, or down towards the bottom of the fastener, such as in FIG. 18. In another embodiment, the threads may be pointed or square shaped. The interlocking teeth my have a concave portion 20 and a convex portion 19 such as shown in FIG. 12, FIG. 13, and FIG. 14. In a preferred embodiment, the convex portion 19 may be'smaller than the concave portion 20 so that the convex portion 19 of a tooth may fit into the concave portion 20 of another tooth, such as in FIG. 12 and FIG. 13. For example, the convex portion 19 of a lower layer of spiral teeth 3 may fit into the concave portion 20 of an upper layer of a spiral set of teeth 3. In another example, a spiral set of teeth 3 (i.e. threads) are advanta geously cut from a square threaded bolt as shown in FIG. 14. Threads (spiral set of teeth 3) can also be produced by rolling, extrusion, casting, and all manners of computer aided manufacturing such as fused deposition, stereo lithography, and 3-dimensional printing. Besides the spiral set of teeth 3 (i.e. thread) conformations shown in FIG. 12, FIG. 13, FIG. 14, FIG. 15, FIG. 16, FIG. 17, and FIG. 18, in another embodiment, the threads may also be comprised of a compression spring with proper pitch and wire diameter to match the flexible core material's 4 diameter. In any case, the pitch and diameter of a spiral set of teeth 3, compression spring, or threads should be commensurate with the pitch and diameter of the flexible core material's 4 pitch and diameter as well as the pitch and diameter of a given nut to be used in conjunction with the flexible fastener 1, so that the nut may be advanced on it. The threads may be fashioned in numerous versions with interchangeable features such as placement and orientation of protrusions, shape and curvature of threads, inclusion or exclusion of interlocking features, and pitch and diameter of threads.

As is previously described, the flexible fastener is useful in numerous situations. The flexible fastener is especially advantageous to easily and inexpensively couple non-parallel and non-aligned members. Additionally, the flexible fastener is also useful in various situations where selective compliance is desired. Among the many situations where the flexible fastener may be advantageously used are: construction, seismic applications, robotics, machine applications, and flexible power transportation. All references cited herein are incorporated by reference.

What is claimed is:

1. A fastener, comprising:

a spiral set of teeth, wherein said spiral set of teeth have a convex portion and a concave portion and wherein the convex portion smaller than said concave portion; and a selectively compliant core material running internally to said spiral set of teeth; and coupling means for connecting said selectively compliant core material to said spiral set of teeth at both distal ends of said spiral net of teeth no that said fastener is laterally flexible along its length.

2. The spiral set of teeth of claim 1, wherein said convex portion of a lower layer of spiral teeth fits into said concave portion of an upper layer of spiral teeth.

3. A fastener, comprising:

a spiral set of teeth, wherein said spiral set of teeth have a convex portion and a concave portion and wherein the convex portion is smaller than said concave portion; and a selectively compliant core material running internally to said spiral set of teeth and along the length of said spiral set of teeth; and coupling means for connecting said selectively compliant core material to said spiral set of teeth at both distal ends of said spiral set of teeth so that said fastener is laterally flexible along its length; and means at a distal end of said spiral set of teeth for imparting rotational movement thereto.

4. The fastener of claim 3, wherein said convex portion of a lower layer of spiral teeth fits into said concave portion of an upper layer of spiral teeth.

* * * * *

UNITED STATES PATENT AND TRADEMARK OFFICE

CERTIFICATE OF CORRECTION

PATENT NO. : 6,955,513 B2 Page 1 of 1
APPLICATION NO. : 10/065564
DATED : October 18, 2005
INVENTOR(S) : Saeed Benjamin Niku It is certified that error appears in the above-identified patent and that said Letters Patent is hereby corrected as shown below:

In the Claims:

Claim 1, column 8, line 5, insert --is-- before “smaller”.

Claim 1, column 8, line 10, change “net” to --set--.

Claim 1, column 8, line 10, change “no” to --so--.

Signed and Sealed this

Eighteenth Day of July, 2006

JON W. DUDAS
*Director of the United States Patent and Trademark Office*